United States Patent
Nakata

(10) Patent No.: US 8,879,094 B2
(45) Date of Patent: Nov. 4, 2014

(54) IMAGE READING APPARATUS WHICH IS ABLE TO TRANSFER AN IMAGE TO AN EXTERNAL DEVICE AND NON-TRANSITORY COMPUTER READABLE MEDIUM

(75) Inventor: Masaki Nakata, Fuchu (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 1170 days.

(21) Appl. No.: 12/765,440

(22) Filed: Apr. 22, 2010

(65) Prior Publication Data

US 2010/0271667 A1    Oct. 28, 2010

(30) Foreign Application Priority Data

Apr. 23, 2009   (JP) .................... 2009-104754

(51) Int. Cl.
G06F 3/12 (2006.01)
H04N 1/00 (2006.01)
H04N 1/333 (2006.01)
H04N 1/32 (2006.01)

(52) U.S. Cl.
CPC .... *H04N 1/00795* (2013.01); *H04N 2201/3287* (2013.01); *H04N 1/33376* (2013.01); *H04N 1/333* (2013.01); *H04N 1/32448* (2013.01); *H04N 2201/0081* (2013.01); *H04N 1/00798* (2013.01); *H04N 1/32363* (2013.01)
USPC .......... 358/1.15; 358/1.9; 358/405; 358/1.14; 358/505; 358/412; 709/238; 709/232; 709/233

(58) Field of Classification Search
USPC ............... 358/1.9, 1.15, 1.14, 505, 405, 412; 709/203, 238, 232, 233
See application file for complete search history.

(56) References Cited

U.S. PATENT DOCUMENTS

| 5,909,286 | A | 6/1999 | Mori |
| 6,462,842 | B1 * | 10/2002 | Hamilton .................... 358/486 |
| 6,760,369 | B1 | 7/2004 | Chida |
| 6,772,245 | B1 * | 8/2004 | Pomerantz et al. ............ 710/60 |
| 2002/0082034 | A1 | 6/2002 | Suzuki |
| 2005/0013322 | A1 * | 1/2005 | Yamagishi .................... 370/468 |

FOREIGN PATENT DOCUMENTS

| JP | 5-268449 | 10/1993 |
| JP | 7-203070 | 8/1995 |
| JP | 9-224097 | 8/1997 |
| JP | 9-307685 | 11/1997 |
| JP | 11-45333 | 2/1999 |
| JP | 11-298554 | 10/1999 |

(Continued)

OTHER PUBLICATIONS

Japanese Office Action in Application No. 2009-104754 dated May 17, 2011.

(Continued)

*Primary Examiner* — Jamares Q Washington
(74) *Attorney, Agent, or Firm* — Buchanan Ingersoll & Rooney PC

(57) ABSTRACT

Disclosed is an image reading apparatus including: an image reading section to read an image; a storage section to store the image; and a control section to detect whether or not the image reading section is in a state of pausing reading of the image, to determine transfer speed of the image to an external device based on a detected result, and to transfer the image to an external device at a determined transfer speed.

12 Claims, 5 Drawing Sheets

(56) References Cited

FOREIGN PATENT DOCUMENTS

| | | |
|---|---|---|
| JP | 2000-71570 | 3/2000 |
| JP | 2001-84116 | 3/2001 |
| JP | 2002-199444 | 7/2002 |
| JP | 2002-244834 | 8/2002 |
| JP | 2008-141489 | 6/2008 |

OTHER PUBLICATIONS

Office Action issued in corresponding Japanese Application No. 2011-095646, mailed Jan. 15, 2013.

* cited by examiner

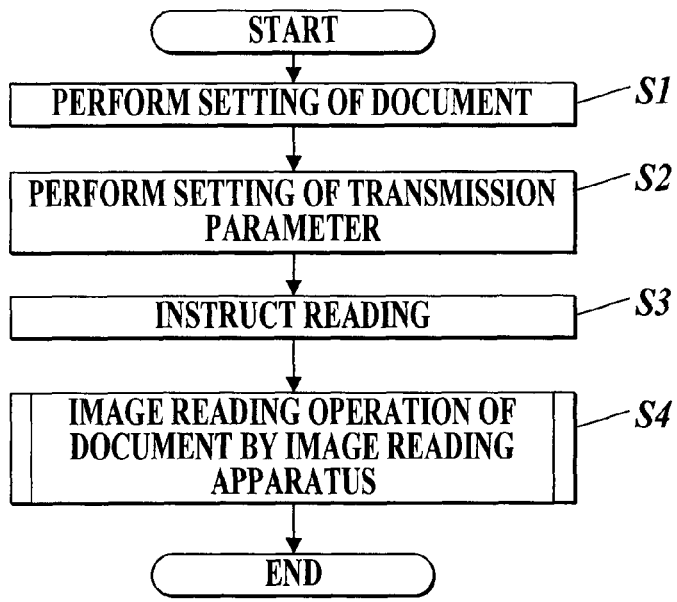
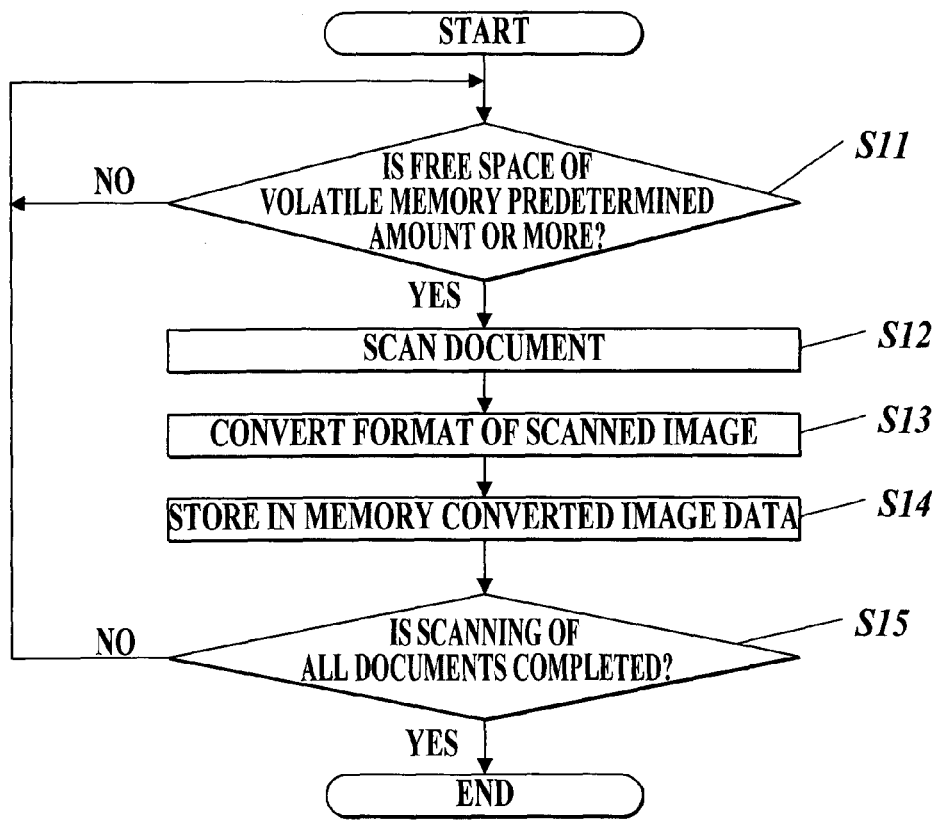

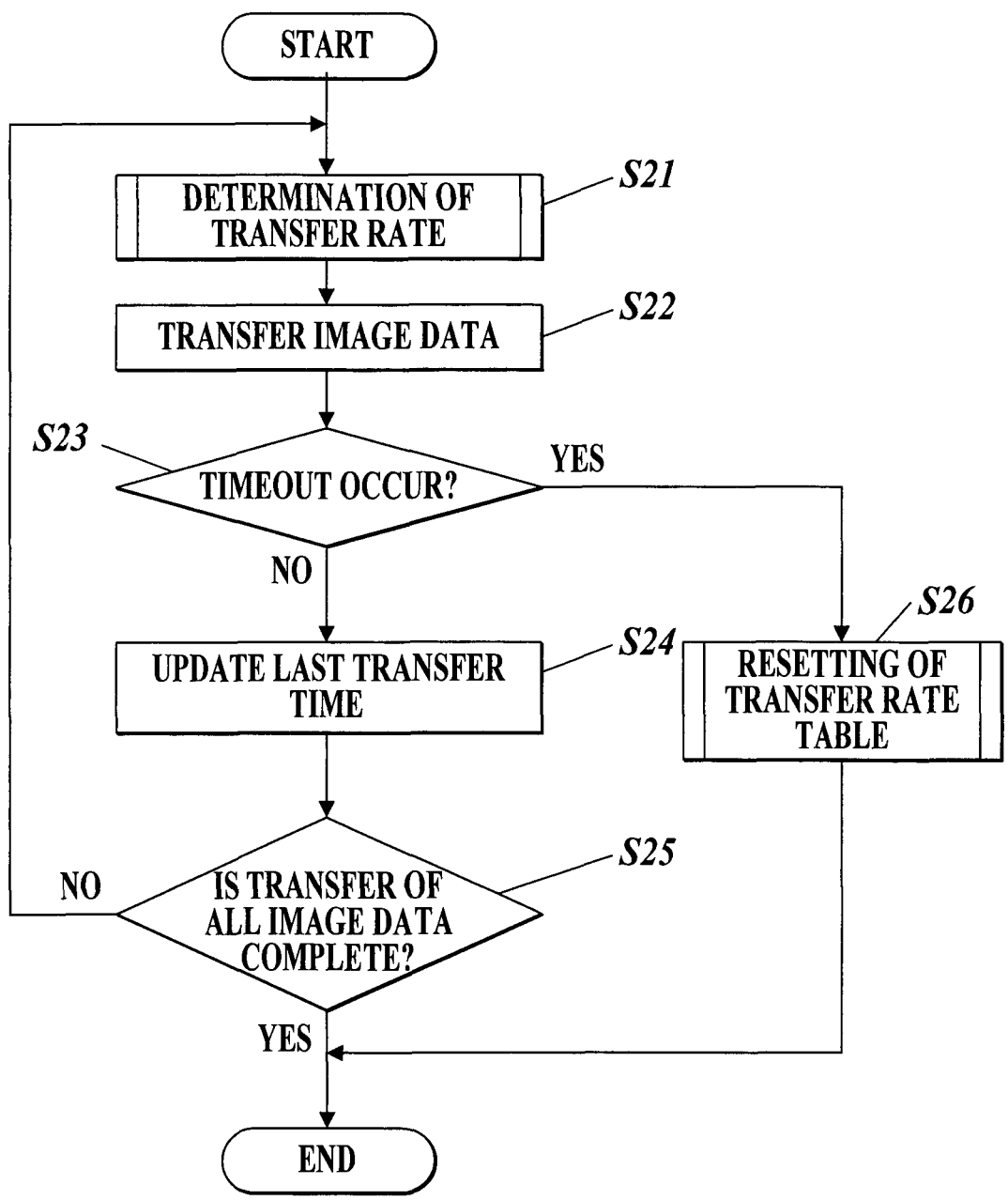

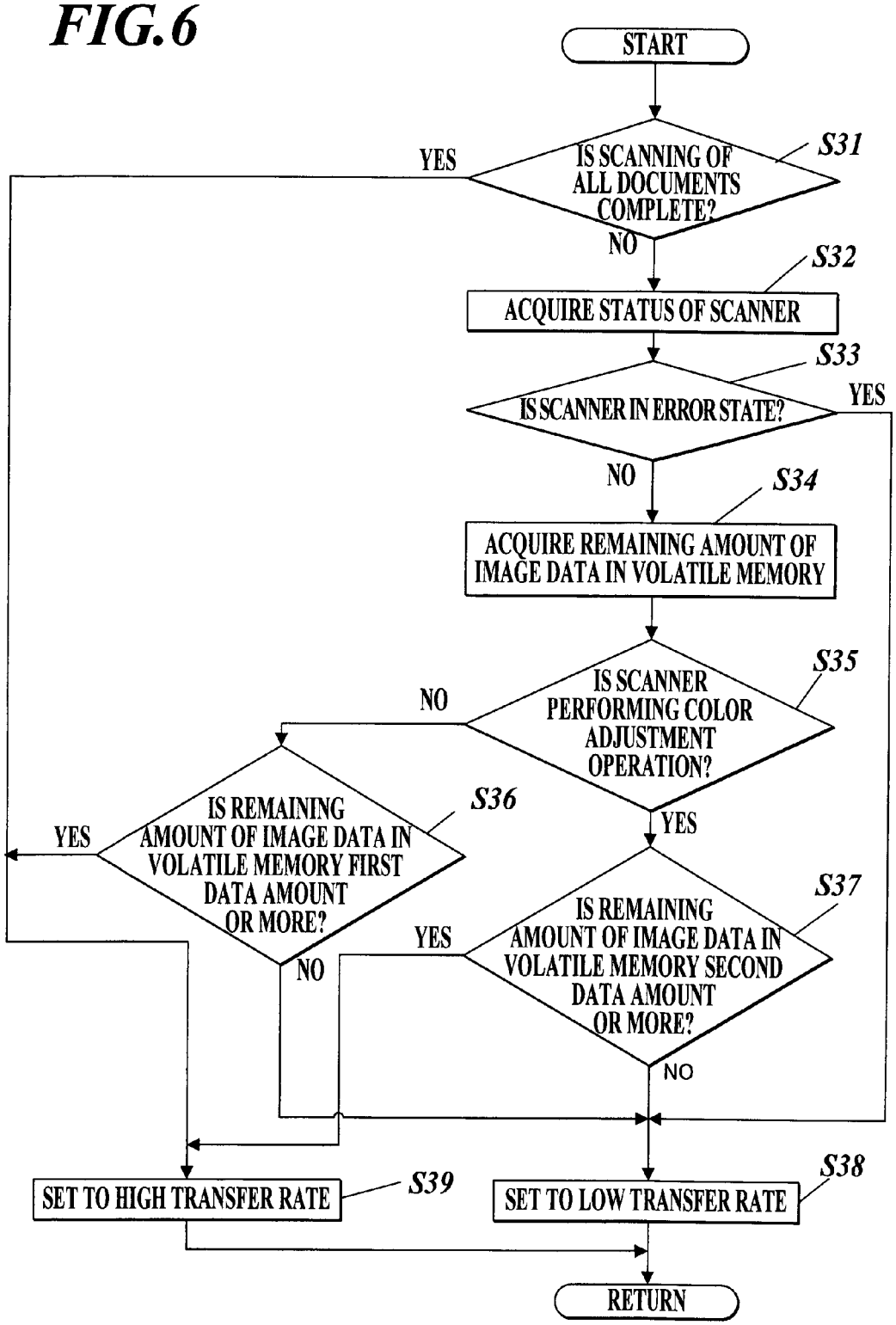

FIG.7

| PROTOCOL | TRANSFER RATE(bps) |
|---|---|
| FTP | 1000 |
| SMTP | 3000 |
| WebDAV | 1500 |
| ⋮ | ⋮ |

START
↓
ACQUIRE LAST TRANSFER TIME — S41
↓
ACQUIRE TIMEOUT OCCURRENCE TIME — S42
↓
RECALCULATE TRANSFER RATE — S43
↓
RETURN

IMAGE READING APPARATUS WHICH IS ABLE TO TRANSFER AN IMAGE TO AN EXTERNAL DEVICE AND NON-TRANSITORY COMPUTER READABLE MEDIUM

CROSS-REFERENCE TO RELATED APPLICATIONS

The present U.S. Patent Application claims priority under the Paris Convention of Japanese Patent Application No. 2009-104754 filed on Apr. 23, 2009 to the Japanese Patent Office, which shall be a basis for correcting mistranslations.

BACKGROUND

1. Field of the Invention

The present invention relates to an image reading apparatus and a computer readable medium.

2. Description of Related Art

In an image reading apparatus such as a scanner, etc., an image forming apparatus is known including a function of converting a read image into data (hereinafter referred to as simply "image data") in a format usable by an external device and transferring the data to the external format. For example, there is an image reading apparatus which uses a network protocol such as FTP (File Transfer Protocol), etc. to transfer image data to the external device (such as a sever, etc.).

The image reading apparatus temporarily stores the image data in the memory and the image data stored in the memory is transmitted to a server. Here, capacity of the memory is limited and it may not be possible to store the whole image data generated in one reading operation as one batch in the memory.

Therefore, there is an image reading apparatus provided with a function to utilize memory capacity effectively. For example, when the image data is composed of a plurality of pages, there is an image forming apparatus including a function which sequentially transmits to the server pages after reading of the image and conversion to data is finished on these pages. In this case, there is also an image reading apparatus including a function which sequentially transmits the data to the server starting from the head portion of the large amount of image data.

In an image reading apparatus where pages converted to data are sequentially sent or data is sequentially sent to the server from the head portion, when reading of the image is paused due to a reason such as paper jam, etc., generation of the image data to be transferred is also paused. When the transfer of image data to the server stops due to the pause of the generation of image data and the transfer of image data is not resumed even after transfer reception waiting time of the server passes, timeout of the transfer processing (hereinafter referred to as simply "timeout") occurs and communication between the image reading apparatus and the server is cut off. In this case, the image data transmitted until then is destroyed, and image reading and transfer of image data needs to be performed again from the beginning.

Thus, there is a known configuration which sends a command from a device of a sending side to a device of a receiving side at predetermined time intervals in order to prevent timeout (For example, Japanese Patent Application Laid-Open Publication No. 2008-141489).

However, the command sent in the configuration described in Japanese Patent Application Laid-Open Publication No. 2008-141489 has no relation with the data to be transferred, and the command causes a communication load which has no relation with the transfer of data. Further, a configuration to receive the command needs to be provided in advance in the device of the receiving side, and thus in order to apply the configuration described in Japanese Patent Application Laid-Open Publication No. 2008-141489, the device of the receiving side needs to be reformed in advance.

SUMMARY

The present invention has been made in consideration of the above problems, and it is one of main objects to provide a technique for preventing timeout without creating communication load which has no relation with the transfer of data and necessity of reforming the device of the receiving side.

An image reading apparatus reflecting one aspect of the present invention includes an image reading section to read an image;

a storage section to store the image; and a control section to detect whether or not the image reading section is in a state of pausing reading of the image, to determine transfer speed of the image to an external device based on a detected result, and to transfer the image to an external device at a determined transfer speed.

It is preferable that in the above described image reading apparatus, the state of pausing reading of the image by the image reading section is a state where an error is occurring in the image reading section.

It is preferable that in the above described image reading apparatus, the control section lowers the transfer speed when the image reading section is in the state of pausing reading of the image compared to when the image reading section is not in the state of pausing reading of the image.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein;

FIG. 3 is a flowchart showing a flow of processing regarding instruction of setting reading operation and instruction of initiating reading operation;

FIG. 4 is a flowchart showing a flow of processing regarding reading of a document and conversion of image data;

FIG. 5 is a flowchart showing a flow of processing regarding transfer of image data;

FIG. 6 is a flowchart showing a flow of processing in determination of transfer rate;

FIG. 7 is a descriptive diagram showing an example of content of a transfer rate table; and FIG. 8 is a flowchart showing a flow of processing regarding recalculation of transfer rate table.

DETAILED DESCRIPTION OF PREFERRED EMBODIMENTS

Embodiments of the present invention will be described in detail with reference to the drawings.

Figure 1:
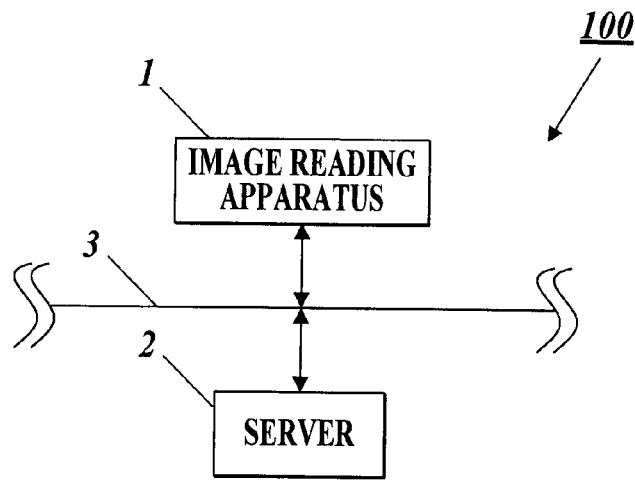
FIG. 1 is a main configuration diagram showing a network system including an image reading apparatus of a preferred embodiment of the present invention.

FIG. 1 is a main configuration diagram of the network system 100 including the image reading apparatus 1 of an embodiment of the present invention.

The network system 100 includes an image reading apparatus 1, server 2 and line 3.

The image reading apparatus 1 reads an image from a medium (hereinafter referred to as "document") to be read such as paper or the like, converts the image to image data 20 in a format usable by an external device and transfers the image data 20 to server 2.

The server 2 receives the image data 20 transferred from the image reading apparatus 1 and stores the image data 20.

Line 3 communicably connects the image reading apparatus 1 and the server 2. The line 3 can be wired or wireless so that the image reading apparatus 1 and the server 2 can be communicably connected and is provided according to the communication device included in the image reading apparatus 1 and the server 2.

Figure 2:
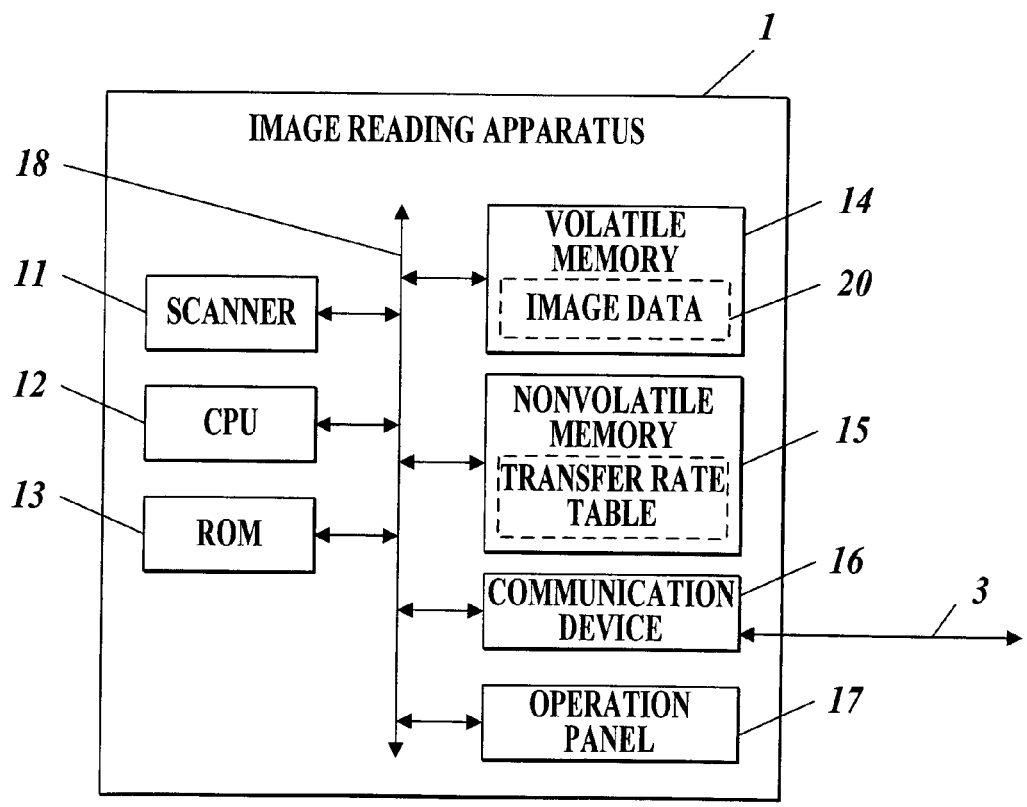
FIG. 2 is a block diagram showing a main configuration of an image reading apparatus.

FIG. 2 is a block diagram showing a main configuration of the image reading apparatus 1.

The image reading apparatus 1 includes a scanner 11, CPU 12, ROM 13, volatile memory 14, nonvolatile memory 15, communication device 16, operation panel 17 and bus 18.

The scanner 11 reads an image from a document. The scanner 11 at least includes a document glass where a document is set, a light source to emit light to the document set on the document glass, and an image scanner to read the tone of the light reflected by the document to convert the light to an electric signal and output the electric signal, and the scanner 11 generates an image based on the electric signal output by the image scanner (hereinbelow referred to as "scanned image").

Further, the scanner 11 includes a configuration to successively read a plurality of documents and the present embodiment is provided with an ADF (Auto Document Feeder) as such configuration. Another device may be used as a configuration to successively read a plurality of documents according to the type of document. Examples of such a device are a holder to successively read negative film, a device to automatically flip pages in order to successively read each page of a book, etc.

The CPU 12 performs operation control of each section of the image reading apparatus 1 and processing of data used by the image reading apparatus 1. The scanned image is converted to the image data 20 by the processing performed by the CPU 12 and stored in the volatile memory 14.

The ROM 13 stores various programs used in operation control of each section and data processing performed by the CPU 12. Examples of programs and the like stored in the ROM 13 are an operating system (OS) of the image reading apparatus 1, conversion processing software to convert an image read by the scanner 11 to image data 20 and other various software, data, etc.

The volatile memory 14 is for example a semiconductor random access memory (RAM) and stores the image data 20. Also, the volatile memory 14 stores data, parameter, etc. generated temporarily in various processing performed by the CPU 12.

The nonvolatile memory 15 is for example a flash memory, hard disk, etc. and stores a later described transfer rate table 21, various software, data, etc. in which a content may be rewritten.

The CPU 12 reads software, data, etc. from the ROM 13 or the nonvolatile memory 15 according to the processing content to execute the above processing and performs operation control of each section of the image reading apparatus 1 and processing of data used by the image reading apparatus 1.

The communication device 16 is a network interface to perform communication with the server 2 through line 3 based on control by the CPU 12. The communication protocol is determined by software and function of the server 2 used in the communication processing by the CPU 12. In the present embodiment, the image reading apparatus 1 performs communication by FTP with the server 2 to transfer image data 20.

The operation panel 17 functions as an input device to perform input operation by the user and also functions as a display device to display various information concerning the operation of the image reading apparatus 1. The displayed content of the operation panel 17 is controlled by the CPU 12.

The bus 18 connects each configuration of the image reading apparatus 1.

Next, the operation of reading the document by the image reading apparatus 1 is described.

The operation of reading the document by the image reading apparatus 1 is performed after setting of the reading operation and initiation instruction of the reading operation. The setting of the reading operation and the initiation instruction of the reading operation is performed based on an input instruction by the user through the operation panel 17.

FIG. 3 is a flowchart showing a flow of processing of the setting of the reading operation and the initiation instruction of the reading operation.

As steps composing processing of the setting of reading operation and initiation instruction of the reading processing according to the present embodiment, there are steps of setting a document (step S1), setting a transmission parameter (step S2), and reading instruction (step S3), and when a reading instruction of step S3 is performed after the setting of steps S1 and S2, the reading processing (step S4) of the document by the image reading apparatus 1 is performed. Step S1 and step S2 may be performed in random order and may be performed in a sequence reverse from the flowchart shown in FIG. 3.

The setting of the document in step S1 is a step to perform various settings concerning reading of the document. As various settings concerning setting of the document, there are for example, reading resolution of the document, color setting, format of image data 20, setting concerning image size, various setting for reading a plurality of documents successively, etc., and other setting items necessary depending on circumstances can be set.

As various setting and operation to read a plurality of documents successively, there are for example, successive scanning, divided scanning, etc.

Successive scanning is a reading operation which includes operation of setting the document a plurality of times in the scanner 11. When successive scanning is performed, the user performs input to perform successive scanning through the operation panel 17 and sets the first amount of documents to be read in the scanner 11. Then, when the user performs the reading instruction, the scanner 11 reads the first amount of documents to be read, and then the scanner 11 waits on standby. Then, the user sets the next amount of documents to be read in the scanner 11 and when the user performs input of instruction to resume reading through the operation panel 17, the scanner 11 reads the next amount of documents to be read. Then, standby of the scanner 11, setting of the documents in the scanner 11 and input of instruction to resume reading is repeated until reading of all documents is finished.

Successive scanning is performed for example, when reading of a document including more pages than the number of pages of documents which can be set in the ADF is performed, when the document includes a document which needs to be fed manually to the scanner 11 in between reading using the ADF, when a document which cannot be set in the ADF is set page by page on the document glass, or the like.

Divided scanning is a reading operation where a document is read a plurality of times to generate one page of scanned image. When the divided scanning is performed, the user performs input to perform divided scanning through the operation panel 17 and sets the first document to be read in the scanner 11. Then, when the user performs the reading instruction, the scanner 11 reads the first document to be read, and then the scanner 11 waits on standby. Then, the user sets the next document to be read in the scanner 11 and when the user inputs the instruction to resume reading through the operation panel 17, the scanner 11 performs reading of the next document to be read. Then, standby of scanner 11, setting of the documents in the scanner 11 and the input of instruction to resume reading is repeated until reading of all documents to generate one page of a scanned image is finished.

Divided scanning is performed for example when a document with a size larger than the document size which can be read by the scanner 11 is read, or the like.

Setting of the transmission parameter in step S2 is a step to perform various setting concerning transmission of image data 20 from the image reading apparatus 1 to the server 2. As various setting in setting of the transmission parameter, there are for example, information necessary to access to the server, format of the image data 20, image size, etc. and other setting items necessary depending on conditions may be set. As information necessary to access to the server, there are for example, information to determine protocol of communication used in transferring data, server name of the network, login user name, login password, port number, directory name of transfer source and transfer destination, proxy setting, etc. and other setting items necessary depending on circumstances may be set.

The reading instruction of step S3 is a step to instruct initiation of the reading of the document by the image reading apparatus 1. For example, the reading instruction is performed by the user performing operation on the input interface to perform instruction to initiate reading of the document, such as pressing the start button provided on the operation panel 17, etc.

When the reading instruction is performed, the reading operation of the document by the image reading apparatus 1 shown in step S4 is performed. The reading operation of the document by the image reading apparatus 1 includes processing of document reading and image data conversion and processing of transferring image data.

First, processing of document reading and image data conversion is described.

FIG. 4 is a flowchart showing a flow of processing of the document reading and image data conversion.

The processing of document reading and image data conversion is composed of the following steps of memory check (step S11), scanning of the document (step S12), format conversion of the scanned image (step S13), memory storage of converted image data (step S14) and check of whether scanning of all documents is completed (step S15).

The memory check of step S11 is a step to check the free space of the volatile memory 14. The CPU 12 checks whether or not the free space of the volatile memory 14 is a predetermined amount of free space or more. The predetermined amount of free space is determined in advance based on the free space of the volatile memory 14 necessary to store in the memory the image memory 20 converted in step S14 and when the free space of the volatile memory 14 is a predetermined amount of free space or more (step S11: YES), the CPU 12 controls operation of the scanner 11 and performs scanning of the document (step S12). When the free space of the volatile memory 14 is not a predetermined amount of free space or more (step S11: NO), the CPU 12 waits on standby until the free space of the volatile memory 14 is a predetermined amount of free space or more.

The document scanning in step S12 is a step to perform reading of the document by the scanner 11 to acquire a scanned image. The acquired scanned image is input to the CPU 12.

After the document scanning in step S12, the CPU 12 performs format conversion of the scanned image (step S13).

The format conversion of the scanned image in step S13 is a step to convert the scanned image to image data 20, in other words, a step to generate the image data 20 from the scanned image. According to the format of the image data 20 set in step S1 and S2, the CPU 12 generates image data 20 of the set format from the scanned image input from the scanner 11.

After the format conversion of the scanned image in step S13, the CPU 12 performs the memory storage of the converted image data (step S14).

The memory storage of the converted image data in step S14 is a step to store image data 20 generated in step S13 in the volatile memory 14. The CPU 12 stores the generated image data 20 in the volatile memory 14.

After the memory storage of the converted image data in step S14, the CPU 12 performs check of whether the scanning of all documents is completed (step S15).

The check of whether scanning of all documents is completed performed in step S15 is a step to judge whether or not reading of all documents and conversion from scanned image to image data 20 is completed. The CPU 12 judges whether or not reading of all documents and conversion from scanned image to image data 20 is completed based on status of the scanner 11, and the setting of the document and content of input operation on the operation panel 17 in step S1. When the reading of all documents and the conversion from scanned image to image data 20 is completed (step S15: YES), the image reading apparatus 1 ends the reading of the document and the image data conversion processing, and when the reading of all documents or the conversion from the scanned image to image data 20 is not completed (step S15: NO), the processing returns to the processing in step S11. When the reading of all documents is complete but the conversion from the scanned image to the image data 20 is not complete, the scanning of the document in step S12 is omitted and the format conversion of the scanned image and the memory storage of the converted image data are performed.

Next, the transfer processing of the image data is described.

The transfer processing of the image data is initiated when a predetermined amount or more of image data 20 is stored in the volatile memory 14. In the present embodiment, when a page of a document of image data 20 is stored in the volatile memory 14, the CPU 12 initiates the transfer processing of the image data. After the transfer processing of the image data is initiated, the processing of document reading and image data conversion is performed concurrently with the transfer processing of the image data.

The image data 20 used in the present embodiment is in a format where the content of the header and a portion of the file of the image data 20 can be defined before the end portion of the image data 20 is generated. For example, there are formats such as a format which can define the information included in the file header before the end portion of the file is generated to successively generate image data 20 corresponding to each page of the document subsequent to the file header (for example PDF (Portable Document Format) etc.) or a format which can define content of a page of the image data 20 previous to a next page when the head address of the next page is defined (for example TIFF (Tagged Image File Format), etc.).

FIG. 5 is a flowchart showing a flow of processing regarding transfer of image data.

The processing of transfer of image data is composed of determination of transfer rate (step S21), transfer of image data (step S22), check of timeout occurrence (step S23), update of last transfer time (step S24), transfer completion check of all image data (step S25) and resetting of transfer rate table 21 (step S26).

The determination of transfer rate in step S21 is a step to determine transfer speed (transfer rate) of image data 20 transferred from image reading apparatus 1 to server 2.

FIG. 6 is a flowchart showing a flow of processing to determine transfer rate.

The determination of transfer rate includes check of whether scanning of all documents is completed (step S31), acquisition of scanner status (step S32), scanner error status check (step S33), acquisition of image data remaining amount in volatile memory (step S34), color adjustment operation check (step S35), judgment of image data remaining amount in volatile memory (step S36, S37), setting of low transfer rate (step S38) and setting of high transfer rate (step S39).

The check of whether scanning of all documents is complete in step S31 is a processing which performs a judgment similar to step S15. When the reading of all documents by the scanner 11 and conversion of the scanned image to the image data 20 is complete (step S31: YES), the CPU 12 sets the transfer rate to high rate (step S39) and when the reading of all documents by the scanner 11 and conversion of the scanned image to the image data 20 is not complete (step S31: NO), the CPU 12 performs acquisition of scanner status (step S32).

In the acquisition of scanner status in step S32, the status of the scanner 11 is checked. Elements to determine the status of the scanner 11 checked in step S32 includes, for example, whether or not the scanner 11 is reading the document, whether the scanner 11 is not reading the document in other words whether the scanner 11 is pausing reading of image, reason of pausing, etc. As reasons for the scanner 11 to pause, there are for example, paper jamming in the ADF, wait for setting of documents or other reasons of error of the scanner 11 or interruption by "color adjustment operation".

The wait for setting of documents is a status in successive scanning or divided scanning where the reading of the set documents is completed and the apparatus is on standby until there is an input instruction that the setting of the next document is finished.

The interruption by the "color adjustment operation" is an operation performed by the scanner 11 to maintain color recognition accuracy of the scanner 11 in reading a document, such as calibration operation, etc. and is an operation separate from the reading of the image performed by the scanner 11. As the scanner 11 repeats reading of the document, an error may occur in the color value of the reference color (for example, white or the like) used in the color determination. Therefore, the interruption by the "color adjustment operation" such as calibration operation, etc. maintains the color recognition accuracy by performing calibration or reset of the color value of the reference color.

During the interruption by the "color adjustment operation", the scanner 11 does not perform reading of the document.

The amount of time used for the "color adjustment operation" is determined in advance, and the CPU 12 can calculate the estimated time that the color adjustment operation will finish based on the initiation timing of the "color adjustment operation".

The interruption by the "color adjustment operation" can be performed when a predetermined number of sheets of the document are read. Alternatively, an error detection section to detect error of the color value of the reference color can be provided and the interruption by the "color adjustment operation" can be performed when the error detection section detects the error.

As for the status of the scanner 11, when paper jamming in the ADF, wait for the document setting or any other error of the scanner 11 occurs, the CPU 12 judges the scanner 11 is in an "error state". As for the status of the scanner 11, when paper jamming in the ADF, wait for the document setting or any other error of the scanner 11 is not occurring, the CPU 12 judges the scanner 11 is not in the "error state".

After the acquisition of the scanner status in step S32, the CPU 12 performs check of the error status of the scanner (step S33).

The check of the error status of the scanner in step S33 is a step to determine whether or not the scanner 11 checked in step S32 is in the "error state".

The CPU 12 judges whether or not the status of the scanner 11 is in the "error state". When the status of the scanner 11 is in the "error state" (step S33: YES), the CPU 12 sets the transfer rate to low rate (step S38) and when the status of the scanner 11 is not in the "error state" (step S33: NO), the CPU 12 acquires the remaining amount of the image data in the volatile memory (step S34).

The acquisition of the remaining amount of image data in the volatile memory in step S34 is a step to acquire the amount of the image data 20 stored in the volatile memory 14. The CPU 12 acquires the amount of the image data 20 stored in the volatile memory 14.

After the acquisition of the remaining amount of image data in the volatile memory in step S34, the CPU 12 performs color adjustment operation check (step S35).

In the color adjustment operation check in step S35, it is determined whether or not the status of the scanner 11 checked in step S32 is during the interruption by the "color adjustment operation". The CPU 12 judges whether or not the status of the scanner 11 is during the interruption by the "color adjustment operation", and when it is not during the interruption by the "color adjustment operation" (step S35: NO), the CPU 12 performs the determination of the remaining amount of image data in the volatile memory in step S36 and when it is during the interruption by the "color adjustment operation" (step S35: YES), the CPU 12 performs the determination of the remaining amount of image data in the volatile memory in step S37.

The determination of the remaining amount of image data in the volatile memory in step S36 is a step to determine whether or not the amount of image data 20 stored in the volatile memory 14 is a predetermined amount (first data amount) or more.

The CPU 12 compares the amount of the image data 20 stored in the volatile memory 14 acquired in step S34 with the first data amount and determines whether or not the amount is the first data amount or more.

Here, the relation between the amount of the image data 20 stored in the volatile memory 14 and timeout is described.

Timeout occurs when the transfer of data is disrupted for a certain period of time or more. When the transfer of data is disrupted for a certain period of time or more, the server 2 performs processing (timeout processing) which determines an error occurred in the communication between the image reading apparatus 1 and the server 2 and cuts off the communication.

On the other hand, if the transfer of data is not disrupted for a certain period of time or more, timeout does not occur.

If transfer of image data 20 is performed at a high transfer rate when the amount of the image data 20 is less than the predetermined amount, transfer of all image data 20 stored in the volatile memory 14 finishes in a short period of time and since there is no image data 20 to be continuously transferred from then on, the transfer of data is disrupted for a certain period of time or more, and there is a possibility that timeout occurs. Therefore, when the amount of the image data 20 stored in the volatile memory 14 is smaller than a predetermined amount, the transfer rate is set to the low rate. Therefore, the amount of the image data 20 stored in the volatile memory 14 is transferred in small amounts and time necessary to transfer the image data 20 is made longer, and thus the transfer processing of data can continue for a long period of time. Even when the transfer rate is low, the transfer processing itself continues and it is expected that the server 2 does not perform timeout processing.

In other words, the image reading apparatus 1 includes a function to prevent timeout by continuing transfer processing of data by lowering the transfer rate when the amount of the image data 20 in the volatile memory 14 is smaller than a predetermined amount.

When the amount of the image data 20 stored in the volatile memory 14 is smaller than the first data amount (step S36: NO), the CPU 12 sets the transfer rate to the low rate (step S38).

On the other hand, when the amount of the image data 20 stored in the volatile memory 14 is the predetermined amount or more, there is enough amount of image data 20 in the volatile memory 14, and the transfer of the image data 20 can continue even if the transfer is performed at a high transfer rate. Therefore, when the amount of the image data 20 stored in the volatile memory 14 is a predetermined amount or more, the transfer rate is set to the high rate. With this, the transfer of image data 20 to the server 2 can be performed smoothly.

When the amount of the image data 20 stored in the volatile memory 14 is the first data amount or more (step S36: YES), the CPU 12 sets the transfer rate to the high rate (step S39).

In step S31, the reason why the CPU 12 sets the transfer rate to the high rate when it is judged that all documents are read by the scanner 11 is because after all documents have been read, "suspension of transfer of image data 20 due to timeout before the remaining documents which are not yet read by the scanner 11 are converted into image data" does not occur. In other words, after all documents have been read, the image reading apparatus 1 can finish the operation of reading the document by finishing the transfer of the remaining image data 20 stored in the volatile memory 14, and the CPU 12 performs control to finish the transfer of the image data 20 promptly at the high transfer rate.

Also, in step S33, the reason why the CPU 12 sets the transfer rate to the low rate when the status of the scanner 11 is in the "error state" is because when the status of the scanner 11 is in the "error state" it is unclear when the reading of the document by the scanner 11 can be resumed, and the timing of when new image data 20 is stored in the volatile memory 14 cannot be determined. In other words, when transfer of image data 20 continues at the high transfer rate when new image data 20 is not stored in the volatile memory 14, the transfer of all image data 20 stored in the volatile memory 14 is finished in a short period of time, and since there is no image data 20 to be continuously transferred from then on, transfer of data is disrupted for a certain period of time or more and there is a possibility that timeout occurs. Therefore, by setting the transfer rate to the low rate, the transfer of the image data 20 can continue for a long time and timeout can be prevented.

The determination of the remaining amount of image data in the volatile memory in step S37 is a step to determine whether or not the amount of image data 20 stored in the volatile memory 14 is a predetermined amount (second data amount) or more, and the predetermined amount is different from the first data amount which is the predetermined amount in step S36. In the present embodiment, the predetermined amount in step S37 is larger than the predetermined amount in step S36.

The value of the first data amount and the second data amount is read out from the ROM 13 or the nonvolatile memory 15. The first data amount and the second data amount can be set freely by the user. In this case, the user sets the value of the first data amount, the second data amount or both through the input device such as the operation panel 17, etc.

The determination of the remaining amount of image data in the volatile memory in step S37 is performed when the status of the scanner 11 checked in step S32 is during the interruption by the "color adjustment operation".

As described above, during the interruption by the "color adjustment operation", the scanner 11 does not perform reading of the document. Therefore, the generation of the image data 20 from the scanned image is temporarily suspended, and the image data 20 stored in the volatile memory 14 does not increase. If the transfer of image data 20 continues unconditionally at the high transfer rate in this state, the transfer of all image data 20 stored in the volatile memory 14 is completed before the "color adjustment operation" finishes and there is a possibility that timeout occurs.

The time used for the "color adjustment operation" is determined in advance, and the reading of the document by the scanner 11 and the generation of the image data 20 are resumed after the "color adjustment operation" finishes. In other words, the CPU 12 can judge whether or not timeout occurs if the transfer of image data 20 continues at the high transfer rate during the time spent on the "color adjustment operation", that is until the generation of the image data 20 resumes.

The second data amount compared with the amount of the image data 20 stored in the volatile memory 14 in step S37 shows an amount of the image data 20 enough so that timeout does not occur even when the transfer of the image data 20 is performed at the high transfer rate during the time spent on the "color adjustment operation".

The processing content in step S37 is similar to the processing in step S36 with the exception of the difference in the predetermined amount.

When the amount of the image data 20 stored in the volatile memory 14 is the second data amount or more (step S37: YES), the CPU 12 judges that timeout will not occur even at the high transfer rate, and the CPU 12 sets the transfer rate to the high rate (step S39). On the other hand, when the amount of the image data 20 stored in the volatile memory 14 is smaller than the second data amount (step S37: NO), the CPU 12 judges there is a possibility that timeout will occur at the high transfer rate, and the CPU 12 sets the transfer rate to the low rate (step S39).

The setting of the low transfer rate in step S38 is a step to set a predetermined transfer rate as the transfer rate of the image data 20. The transfer rate set in step S38 is stored in the transfer rate table 21.

FIG. 7 is a descriptive diagram showing an example of content of a transfer rate table 21.

As shown in FIG. 7, the transfer rate table 21 is data in a table form including items of protocol and transfer rate and the transfer rate table 21 is stored in the nonvolatile memory 15.

The protocol is an item which shows protocol name of the communication and as a record of the protocol item, for example FTP, SMTP (Simple Mail Transfer Protocol), WebDAV (Web-based Distributed Authoring and Versioning) and other various communication protocol names are set.

The transfer rate is an item to set "the transfer rate so that timeout will not occur" used in various protocols set in the item of the protocol, and the unit is in bps. In the example shown in FIG. 7, the transfer rate is shown in bps (bits per second), and 1000 (bps) is set for the transfer rate of FTP, 3000 (bps) is set for the transfer rate of SMTP and 1500 (bps) is set for the transfer rate of WebDAV. Although not shown in FIG. 7, other protocol and its transfer rate can be set in the transfer rate table 21.

In the processing of step S38, the CPU 12 reads the transfer rate table 21 from the nonvolatile memory 15 and sets the transfer rate set by the transfer rate table 21 for the protocol used in the transfer of the image data 20 as the transfer rate of the image data 20.

In the present embodiment, the transfer rate for "FTP" in the transfer rate table 21 which is "1000 (bps)" is set. FIG. 7 and the above described transfer rate are merely one example and may be modified accordingly.

The setting of the high transfer rate in step S39 is a step to set the transfer rate of image data 20 to the maximum transfer rate which can be allocated for the transfer of the image data 20. As the maximum transfer rate, there are for example the maximum transfer rate set for the standard of the communication device 16, the transfer rate set in advance as the maximum transfer rate which can be allocated in the communication with the server 2, the transfer rate set in advance as the transfer rate which can be allocated for the transfer of the image data 20 or the like, and the maximum transfer rate can be suitably set according to various items demanded in the transfer of the image data 20.

The transfer rate set in the processing in step S38 cannot exceed the transfer rate set in the processing in step S39. The transfer rate set in the processing in step S38 is a lower transfer rate than the maximum transfer rate set in step S39. Therefore, in the present embodiment, the transfer rate set in step S38 is referred to as the "low transfer rate" and the transfer rate set in step S39 is referred to as the "high transfer rate".

The CPU 12 performs the processing in step S38 or step S39 to determine the transfer rate and through the processing shown in the flowchart of FIG. 6, the CPU 12 ends the determination of the transfer rate in step S21.

After the determination of the transfer rate in step S21, the CPU 12 performs the transfer of the image data (step S22).

The transfer of the image data in step S22 is a step to perform transfer of image data 20 from the image reading apparatus 1 to the server 2. The CPU 12 reads the image data 20 from the volatile memory 14 and transfers the image data 20 through the communication device 16 and the line 3 to the server 2.

The check of timeout occurrence in step S23 is a step to determine whether or not timeout processing is performed by the server 2. The CPU 12 checks the status of communication with the server 2 and determines whether or not the communication (in the present embodiment FTP connection) for the transfer of the image data 20 is maintained. When the communication for the transfer of the image data 20 is maintained, the CPU 12 updates the last transfer time (step S24), and when the communication for the transfer of the image data 20 is not maintained in other words when timeout processing is performed, the CPU 12 performs resetting of the transfer rate table 21 (step S26).

The update of the last transfer time in step S24 is a step to store and update the last time (last transfer time) at which the transfer of the image data 20 in step S22 was performed. The CPU 12 acquires the last transfer time and stores the time in the volatile memory 14. If a last transfer time stored in the past is already stored in the volatile memory 14, the CPU 12 updates the last transfer time stored in the volatile memory 14.

After the update of the last transfer time in step S24, the CPU 12 performs check of whether the transfer of all image data is completed (step S25).

The check of whether the transfer of all image data is completed in step S25 is a step to determine whether or not there is image data 20 stored in the volatile memory 14. The CPU 12 checks whether or not the image data 20 is stored in the volatile memory 14. When the image data 20 is stored in the volatile memory 14 (step S25: YES), the processing returns to step S21. When the image data 20 is not stored in the volatile memory 14 (step S25: NO), the CPU 12 ends the transfer processing of the image data.

The resetting of the transfer table 21 in step S26 is a step to recalculate and reset the transfer rate set for the communication protocol used in the transfer of image data 20 among the transfer rate set in the transfer rate table 21.

FIG. 8 is a flowchart showing a flow of processing of resetting of the transfer rate table 21.

As processing of resetting the transfer rate table 21, there are acquisition of the last transfer time (step S41), acquisition of timeout occurrence time (step S42) and recalculation of the transfer rate (step S43). After the processing of step S41 and S42 are performed, the processing of step S43 is performed. Step S41 and step S42 may be performed in random order and may be performed in a sequence reverse from the flowchart shown in FIG. 8.

The acquisition of the last transfer time in step S41 is a step to acquire the last transfer time stored in the volatile memory 14. The CPU 12 reads out and acquires the last transfer time stored in the volatile memory 14.

The acquisition of the timeout occurrence time in step S42 is a step to acquire the time when communication for transfer of the image data 20 was cut off due to timeout processing of the server 2. The CPU 12 acquires the time the communication (in the present embodiment the FTP connection) for the transfer of the image data 20 was cut off and stores the time in the volatile memory 14.

The recalculation of the transfer rate in step S43 is a step to recalculate and reset the transfer rate set for the protocol of the communication used in the transfer of the image data 20 based on the last transfer time acquired in step S41 or the timeout occurrence time acquired in step S42. The recalculation of the transfer rate is performed based on the following formula and the value calculated from the recalculation is reset as the transfer rate of the protocol name (in the present embodiment "FTP") of the communication used for the transfer of the image data 20.

$$\text{transfer unit}/(\text{timeout occurrence time} - \text{last transfer time}) \quad (1)$$

The transfer unit is the minimum unit of data in the transfer of the image data 20.

For example, when the server 2 operates with the specifications of "perform timeout processing when communication at a transfer rate below a predetermined transfer rate continues for a certain period of time or more", timeout may occur depending on the value of the transfer rate set by the transfer rate table 21. Therefore, the processing of step S43 recalculates and resets the transfer rate to prevent timeout due to the reason described above.

On the other hand, depending on the value of the transfer rate set in the transfer rate table 21, if the scanning of the image pauses for a long time, the transfer of all image data 20 may finish even with a transfer of image data 20 at a low transfer rate, and timeout processing may occur. Therefore, the transfer of the image data 20 can continue for even a longer period of time by setting the transfer rate to an even lower value. In this case, a value of the minimum transfer rate in which continuation of the transfer of the image data 20 succeeded in the past can be stored and the resetting can be performed based on the value of the minimum transfer rate so that timeout does not occur due to the value of the transfer rate being too low when the specification of the server 2 is to "perform timeout processing when communication at a transfer rate below a predetermined transfer rate continues for a certain period of time or more".

After the processing of step S43, through the processing shown in the flowchart of FIG. 8, the resetting of the transfer rate table 21 in step S26 ends.

After the resetting of the transfer rate table 21 in step S26, the CPU 12 ends the image data transfer processing.

When the processing of transferring image data ends after the processing in step S26, the processing of document reading and image data conversion performed concurrently with the transfer processing of the image data ends also at the same time.

After both the processing of document reading and image data conversion and the processing of transferring image data ends, the CPU 12 ends the document reading operation by the image reading apparatus 1 in step S4.

According to the present embodiment, timeout can be prevented by continuing the transfer of image data 20 with control of the transfer rate of the image data 20 and therefore, communication which has no relation with the transfer of data and reform of the server to receive the communication is not necessary. By using the image reading apparatus 1 of the present embodiment, timeout can be prevented without necessity of generation of communication load which has no relation with the transfer of data or reform of the device on the receiving side.

The descriptions of the embodiments disclosed are to show an example of the present invention in all aspects, and thus are not intended to limit the present invention. The scope of the present invention is limited solely by the claims and not the above description and it is intended that the present invention include modifications that come within the scope of the claims and their equivalents.

For example, the present invention can be applied to an apparatus including a function other than the configuration necessary to practice the present invention, such as a printer, MFP (Multifunction Peripheral) including a scanner and a function to transfer image data.

The transfer rate is not limited to two levels, high and low, and three or more transfer rates can be set depending on conditions. It can also be set to calculate the optimum transfer rate depending on conditions.

The transfer rate for each protocol set in the transfer rate table can be manually set individually. In this case, the transfer rate is set through an input device such as an operation panel.

The initiation of the transfer of the image data is not limited to after finishing the generation of the image data of one page and the transfer of the image data can be initiated at the timing when the transfer of the image data can be initiated.

The protocol of communication used in the transfer of the image data is not limited to FTP and other protocol can be used. Other protocols include, for example, SMTP, WebDAV and other various protocols of communication as shown in FIG. 7 and described above, however, any protocol which can transfer files can be used and is not limited to a protocol presently used and a protocol developed and standardized in the future can be used. With this, timeout can be smoothly prevented when there is a possibility that timeout occurs in the processing of transfer of data.

The present invention is not limited to transfer of data through communication and can be applied to transfer of data by other connection forms. Examples include, connecting an image reading apparatus and an external device (server, etc.) to receive the image data by a connection system of serial connection or parallel connection and to transfer data through the transfer path of data of the connection system. As an example of a connection system of serial or parallel connection, there are for example, USB (Universal Serial Bus), IEEE1394, etc., however, any connection system which can transfer files can be used, and is not limited to a connection system presently used and a connection system developed and standardized in the future can also be used. With this, timeout can be smoothly prevented when there is a possibility that timeout occurs in the processing of transfer of data.

The image reading apparatus is not limited to communication with one server and can communicate with a plurality of servers and image data can be transferred sequentially or concurrently to a plurality of servers. In this case, the protocol used for transfer of image data may be different with respect to each server and even if the protocol is the same, condition of timeout may be different for each server. Therefore, different transfer rate tables can be set for each of the plurality of servers. With this, transfer of image data can continue at an optimum transfer rate for each server when the transfer of image data is performed at a low transfer rate.

The separate operation other than the reading of the image performed by the image reading section of the scanner 11, etc., is not limited to "color adjustment operation" such as calibration. Examples of separate operation other than the reading of the image performed by the image reading section excluding "color adjustment operation" include rotation angle adjustment (adjustment of loss of synchronism, etc.) of the motor included in the image reading section and the like, and other separate operation other than the reading of the image performed by the image reading section are also included.

The above description discloses an example where a ROM is used as the computer readable medium including a program according to the present invention, however the present invention is not limited to this example. As other computer readable mediums, a nonvolatile memory such as a flash memory, etc., portable recording medium such as a CD-ROM, etc., or the like can be applied. Also, as a medium of the present invention to provide data of a program through a communication line a carrier wave can be applied to the present invention.

According to an aspect of the preferred embodiments of the present invention, there is provided an image reading apparatus including:

an image reading section to read an image;

a storage section to store the image; and a control section to detect whether or not the image reading section is in a state of pausing reading of the image, to determine transfer speed of the image to an external device based on a detected result, and to transfer the image to an external device at a determined transfer speed.

According to an aspect of the preferred embodiments of the present invention, there is provided a computer readable medium embodying a program to allow a computer to function as:

an image reading section to read an image;
a storage section to store the image; and
a control section to detect whether or not the image reading section is in a state of pausing reading of the image, to determine transfer speed of the image to an external device based on a detected result, and to transfer the image to an external device at a determined transfer speed.

According to the present embodiment, the CPU 12 detects whether or not the scanner 11 is pausing the reading of the image from the document and determines the transfer rate based on the detected result. With this, the scanner 11 can change the transfer rate based on whether or not the scanner 11 is in a paused state. The transfer rate can be switched between a transfer rate when reading of the image from the document is being performed by the scanner 11, in other words a transfer rate where timeout does not occur even if the image data 20 is transferred to the server 2 at a high transfer rate and a transfer rate to prevent timeout by continuing transfer of the image data 20 for a long period of time when new image data 20 is not generated based on the pause of the reading of the image by the scanner 11. Consequently, transfer of the image data 20 where timeout is prevented can be realized.

According to the present embodiment, timeout can be prevented by continuing the transfer of image data 20 with control of the transfer rate of the image data 20 and therefore, communication which has no relation with the transfer of data and reform of the server to receive the communication is not necessary. By using the image reading apparatus 1 of the present embodiment, timeout can be prevented without necessity of generation of communication load which has no relation with the transfer of data or reform of the device on the receiving side.

According to an aspect of the preferred embodiments of the present invention, there is provided an image reading apparatus including:

an image reading section to read an image;
a storage section to store the image; and
a control section to acquire data amount of the image stored in the storage section, to determine transfer speed of the image to an external device based on the data amount, and to transfer the image to the external device at a determined transfer speed.

The CPU 12 acquires the amount of the image data 20 stored in the volatile memory 14 and determines the transfer rate based on the amount of the image data 20. With this, the transfer rate can be changed based on the amount of the image data 20 stored in the volatile memory 14. The transfer rate can be switched between a transfer rate when there is enough amount of image data 20 in the volatile memory 14, in other words when timeout does not occur even if the image data 20 is transferred to the server 2 at a high transfer rate and a transfer rate to prevent timeout by continuing the transfer of the image data 20 for a long period of time based on the lack in amount of the image data 20 stored in the volatile memory 14. Consequently, transfer of the image data 20 where timeout is prevented can be realized.

According to the present embodiment, timeout can be prevented by continuing the transfer of the image data 20 with the control of the transfer rate of the image data 20 and therefore, communication which has no relation with the transfer of data and reform of the server to receive the communication is not necessary. By using the image reading apparatus 1 of the present embodiment, timeout can be prevented without necessity of generation of communication load which has no relation with the data transfer or reform of the device on the receiving side.

According to an aspect of the preferred embodiments of the present invention, there is provided an image reading apparatus including:

an image reading section to read an image;
a storage section to store the image; and
a control section to judge whether or not the image reading section is performing a separate operation other than reading of the image, to determine a transfer speed of the image to an external device based on a result of judgment, and to transfer the image to the external device at a determined transfer speed.

The CPU 12 judges whether or not the scanner 11 is performing a separate operation other than the reading of the image and determines the transfer rate based on the judgment result. With this, the transfer rate can be changed based on whether or not the scanner 11 is performing a separate operation other than the reading of the image. The transfer rate can be switched between a transfer rate when the scanner 11 is not performing a separate operation other than the reading of the image, in other words, timeout does not occur even if the image data 20 is transferred at a high transfer rate to the server 2 based on the reading of the image by the scanner 11 continuing and the new image data 20 being successively generated and a transfer rate when the scanner 11 is performing a separate operation other than the reading of the image, in other words, a transfer rate to prevent timeout by continuing transfer of the image data 20 for a long period of time based on the reading of the image by the scanner 11 being paused and the new image data 20 not being generated. Consequently, transfer of the image data 20 where timeout is prevented can be realized.

According to the present embodiment, timeout can be prevented by continuing the transfer of the image data 20 with the control of the transfer rate of the image data 20 and therefore, communication which has no relation with the transfer of data and reform of the server to receive the communication is not necessary. By using the image reading apparatus 1 of the present embodiment, timeout can be prevented without necessity of generation of communication load which has no relation with the data transfer or reform of the device on the receiving side.

Preferably, the state of pausing reading of the image by the image reading section is a state where an error is occurring in the image reading section.

A state where the reading of the image is paused is a state where an error has occurred in the scanner 11. Error of the scanner 11 due to reasons such as paper jamming of the ADF, wait for setting of the document or any other reason of error of the scanner 11 requires manual procedure to resolve the error in many cases and it is unclear when the error will be resolved and the scanning of the document will resume. Therefore, by changing the transfer rate when an error occurs in the scanner 11, timeout can be prevented more reliably.

Preferably, the control section lowers the transfer speed when the image reading section is in the state of pausing reading of the image compared to when the image reading section is not in the state of pausing reading of the image.

When the reading of the image by the scanner 11 is paused, the CPU 12 lowers the transfer rate compared to a state where the scanner 11 is not pausing the reading of the image, and the image data 20 stored in the volatile memory 14 before the scanner 11 paused the reading of the image can be transferred in small amounts so that the transfer of the image data 20 continues for a long period of time to prevent timeout.

Preferably, the separate operation other than the reading of the image is color adjustment operation of the image reading section.

The separate operation other than the reading of the image by the scanner 11 is the "color adjustment operation" by the scanner 11. When the scanner 11 performs the "color adjustment operation", the reading of the image from the document by the scanner 11 is paused temporarily, and therefore, by changing the transfer rate when it is judged that the "color adjustment operation" is being performed by the scanner 11, timeout can be prevented more reliably.

Preferably, the control section acquires data amount of the image stored in the storage section and determines the transfer speed based on the result of the judgment and the data amount.

Preferably, the control section determines the transfer speed based on a result of comparison between the data amount and a predetermined data amount.

The CPU 12 determines the transfer rate based on the result of comparison between the amount of the image data 20 stored in the volatile memory 14 and a predetermined amount, and therefore, the amount of image data 20 as the standard to switch the transfer rate can be clearly determined.

Preferably, the image reading apparatus further includes a data amount setting section to set the predetermined data amount.

The user can manually set the predetermined amount by input through the operation panel 17. With this, the CPU 12 can change the transfer rate with the amount of the image data 20 determined freely by the user as the standard.

Preferably, the control section lowers the transfer speed when the data amount is smaller than the predetermined data amount, compared to when the data amount is the predetermined data amount or larger.

When the amount of the image data 20 stored in the volatile memory 14 is smaller than the predetermined amount, the CPU 12 lowers the transfer rate compared to when the amount of the image data 20 stored in the volatile memory 14 is the predetermined amount or larger. Consequently, timeout can be prevented by continuing the transfer of the image data 20 for a long period of time by transferring the image data 20 stored in the volatile memory 14 in small amounts when the amount of the image data 20 stored in the volatile memory 14 is not enough to continue the transfer of the image data 20 at the high transfer rate.

Preferably, the control section lowers the transfer speed based on a predetermined transfer speed.

The CPU 12 determines the transfer rate when the transfer rate is lowered based on the transfer rate set in the transfer rate table 21 and consequently, the processing load to calculate the transfer rate when the transfer rate is lowered can be reduced.

Further, the minimum transfer rate in which timeout did not occur in the past can be set in the transfer rate table 21 to perform transfer of the image data 20 using the minimum transfer rate in which timeout does not occur and therefore, timeout can be prevented more reliably.

Preferably, the predetermined transfer speed is associated with a protocol to transfer the image.

The transfer rate set in the transfer rate table 21 is associated with protocol names of various communication and the CPU 12 can read the transfer rate associated with the protocol name of the communication used in the transfer of the image data 20 and the transfer rate can be lowered.

When the transfer rate where timeout occurs is different in each protocol of communication, the transfer of the image data 20 can be performed by the low transfer rate to prevent timeout using the optimum transfer rate for the protocol used in the transfer of the image data 20.

Preferably, the control section acquires last transfer time when the image was transferred to the external device;

the control section acquires time when timeout occurred when the timeout occurred in transfer of the image;

the control section calculates a new transfer speed based on the last transfer time and the time when timeout occurred; and the control section changes the predetermined transfer speed based on newly calculated transfer speed.

The CPU 12 acquires the last transfer time and the timeout occurrence time and performs recalculation of the transfer rate based on the last transfer time and timeout occurrence time to update the transfer rate set in the transfer rate table 21. With this, when timeout occurs in the transfer of the image data 20 by a low transfer rate set based on the transfer rate table 21, the transfer rate is updated and the recalculated updated transfer rate can be used in subsequent transfer of image data 20. Consequently, the possibility of preventing timeout rises and timeout can be prevented more reliably.

What is claimed is:

1. An image reading apparatus comprising:
   an image reading section to read an image;
   a storage section to store the image; and
   a control section to detect whether or not the image reading section is in a state of pausing reading of the image, to determine a first transfer speed of the image to an external device based on a detected result, and to transfer the image to an external device at the determined first transfer speed,
   wherein:
   the control section acquires last transfer time at which the image was transferred to the external device;
   the control section acquires time at which timeout occurred when the timeout occurred in transfer of the image;
   the control section calculates a new second transfer speed based on the last transfer time and the time at which timeout occurred; and
   the control section changes the first transfer speed to the calculated second transfer speed.

2. The image reading apparatus of claim 1, wherein the state of pausing reading of the image by the image reading section is a state where an error is occurring in the image reading section.

3. The image reading apparatus of claim 1, wherein the control section lowers the first transfer speed when the image reading section is in the state of pausing reading of the image compared to when the image reading section is not in the state of pausing reading of the image.

4. The image reading apparatus of claim 3, wherein the control section lowers the first transfer speed based on a predetermined transfer speed.

5. The image reading apparatus of claim 4, wherein the predetermined transfer speed is associated with a protocol to transfer the Image.

6. A non-transitory computer readable medium embodying a program to allow a computer to function as:
   an image reading section to read an image;
   a storage section to store the image; and
   a control section to detect whether or not the image reading section is in a state of pausing reading of the image, to determine a first transfer speed of the image to an external device based on a detected result, and to transfer the image to an external device at the determined first transfer speed,
   wherein:
   the control section acquires last transfer time at which the image was transferred to the external device:
   the control section calculates a new second transfer speed based on the last occurred in transfer of the image:

the control section calculates a new second transfer speed based on the last transfer time and the time at which timeout occurred: and the control section changes the first transfer speed to the calculated second transfer speed.

7. The computer readable medium of claim 6, wherein the state of pausing reading of the image is a state where an error is occurring in the reading of the image.

8. The computer readable medium of claim 6, wherein the control section lowers the first transfer speed when in the state of pausing reading of the image compared to when not in the state of pausing reading of the image.

9. The computer readable medium of claim 8, wherein the control section lowers the first transfer speed based on a predetermined transfer speed.

10. The computer readable medium of claim 9, wherein the predetermined transfer speed is associated with a protocol to transfer the image.

11. An image reading apparatus comprising:
an image reading section to read an image;
a storage section to store the image; and
a control section to detect whether the image reading section is paused, to determine a first transfer speed of the image to an external device if the image reading section is paused, and to transfer the image to an external device at the determined first transfer speed, wherein the storage section stores a lowest supported transfer speed with which transfer of the image to the external device successfully continued in the past; and at a predetermined timing, the control section changes the first transfer speed to the lowest supported transfer speed stored in the storage section.

12. A non-transitory computer readable medium embodying a program to allow a computer to function as:
an image reading section to read an image;
a storage section to store the image; and
a control section to detect whether the image reading section is paused, to determine a first transfer speed of the image to an external device if the image reading section is paused, and to transfer the image to an external device at the determined first transfer speed, wherein the storage section stores a lowest supported transfer speed with which transfer of the image to the external device successfully continued in the past; and at a predetermined timing, the control section changes the first transfer speed to the lowest supported transfer speed stored in the storage section.

\* \* \* \* \*